(No Model.)
T. D. NOONE.
CATERPILLAR TRAP.
No. 505,226. Patented Sept. 19, 1893.
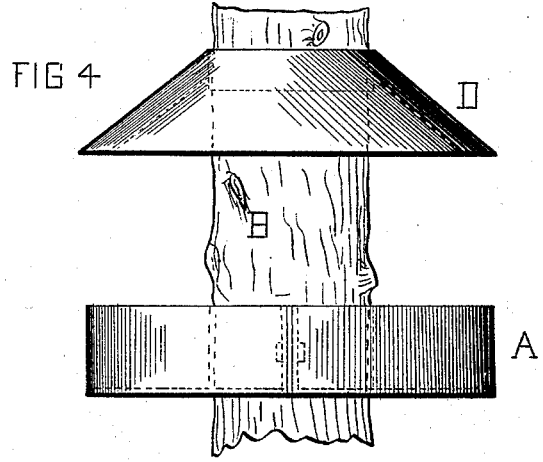
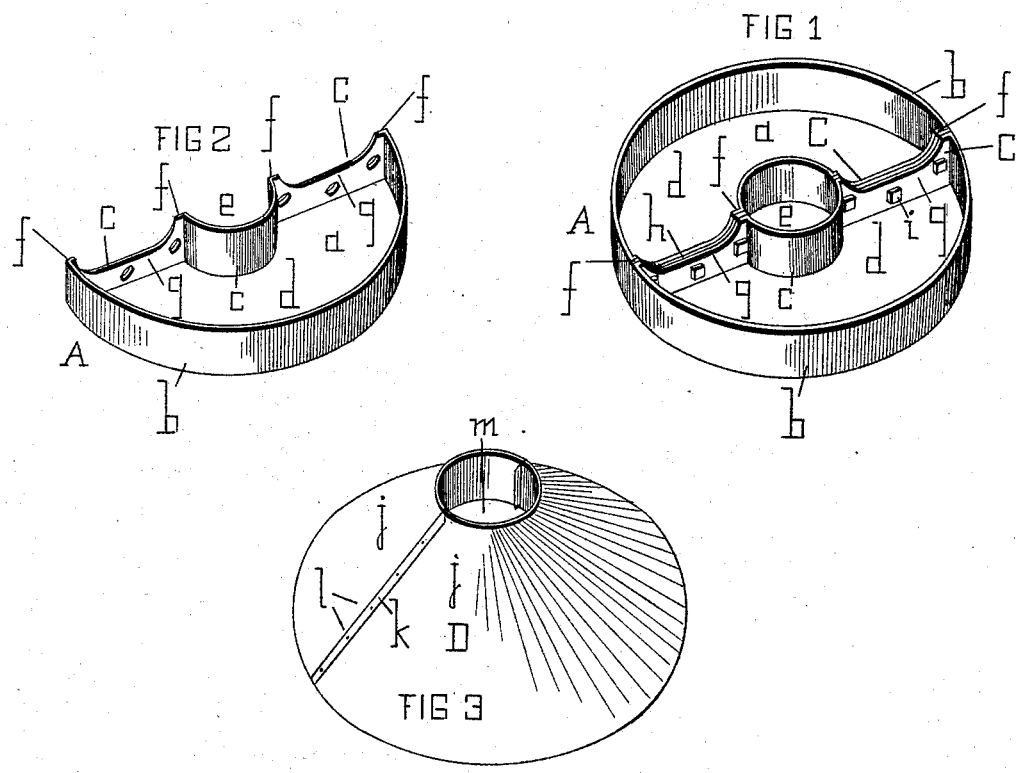
Witnesses
Wm. S. Hoffman
John R. Semple
Inventor
Thomas D. Noone
by Francis D. Pastorius
Attorney

UNITED STATES PATENT OFFICE.

THOMAS D. NOONE, OF CAMDEN, NEW JERSEY.

CATERPILLAR-TRAP.

SPECIFICATION forming part of Letters Patent No. 505,226, dated September 19, 1893.

Application filed June 1, 1893. Serial No. 476,203. (No model.)

*To all whom it may concern:*

Be it known that I, THOMAS D. NOONE, a citizen of the United States, residing at Camden, in the county of Camden and State of New Jersey, have invented certain new and useful Improvements in Caterpillar-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention is for preventing caterpillars from ascending the trunk of a tree.

It consists in a double cylinder closed at the bottom so as to form an annular vessel capable of holding a sticky-liquid, and a central trunk-opening.

For facility in placing the trap on the trunk of a tree, it is divided diametrically and the contacting edges provided with flanges the ends of which are higher than the middle. In practice the central opening is brought together around the trunk, and after packing is placed between the flanges they are bolted together. A shedder is used to prevent rain from dropping into and diluting the sticky liquid which catches and destroys the catterpillars.

On reference to the accompanying sheet of drawings making part of this specification: Figure 1 is a perspective view of a caterpillar-trap which embodies my invention. Fig. 2 is a section of the trap in perspective. Fig. 3 is a perspective top-view of the shedder; and Fig. 4 is a side elevation of a tree-trunk and the trap with its shedder fixed on it.

Similar letters refer to similar parts in the several views.

A is a double-cylinder or trap composed of the bottom, $a$, and the cylinders or sides, $b$, $c$, which form an annular space, $d$, for containing a sticky-liquid, and a central opening, $e$, for the trunk B of a tree.

For placing the trap around the trunk, it is divided diametrically and the contacting edges provided with flanges C the ends, $f$, of which are higher than the middle, $g$.

In applying the trap to the trunk, the flanges C are brought together around it, and after packing, $h$, is placed between them they are bolted together as shown at $i$. The central or middle reduction, $g$, in the height of each flange is to permit the sticky-liquid of the annular-space, $d$, to circulate over the flanges, and thus prevent the caterpillars from crawling over them to the trunk, and to be destroyed while endeavoring to cross the sticky-liquid.

To intercept rain and keep it from dropping into the trap and diluting the sticky-liquid, I fix a shedder D around the trunk B at a suitable distance above the trap. It is in sections, $j$, provided with flanges, $k$, which bolt together at $l$, for catching and dropping rain beyond the outer rim of the trap. The inner rim forms the trunk-opening, $m$.

I claim—

1. A caterpillar-trap composed of a divided double-cylinder having a central-opening for embracing a tree-trunk, and a bottom between the cylinders forming an annular space capable of holding a sticky-liquid, in combination with bolting-flanges which are higher at the ends than at the middle, for the purpose shown and described.

2. A caterpillar-trap composed of a divided double-cylinder having a central-opening for embracing a tree-trunk, and a bottom between the cylinders forming an annular space capable of holding a sticky-liquid, bolting-flanges which are higher at the ends than at the middle, and a rain-shedder embracing the same tree trunk at a suitable distance above the trap, for the purpose shown and described.

3. A caterpillar trap having its members provided on their inner sides with the bolting-flanges C which are united laterally together and constructed to form the collar $c$ which is adapted to embrace the trunk of a tree, each section having its bolting flange extending radially from the trunk-collar to the vertical segmental shell and forming with the flat bottom of the member a semi-circular receptacle, substantially as and for the purposes described.

In testimony whereof I affix my signature in presence of two witnesses.

THOMAS D. NOONE.

Witnesses:
FRANCIS D. PASTORIUS,
J. WILLARD MORGAN.